(12) United States Patent
Blair-Goldensohn et al.

(10) Patent No.: US 9,317,559 B1
(45) Date of Patent: *Apr. 19, 2016

(54) SENTIMENT DETECTION AS A RANKING SIGNAL FOR REVIEWABLE ENTITIES

(71) Applicant: Google Inc., Mountain View, CA (US)

(72) Inventors: Sasha Blair-Goldensohn, New York, NY (US); Kerry Hannan, Sunnyside, NY (US); Ryan McDonald, New York, NY (US); Tyler Neylon, Mountain View, CA (US); Jeffrey C. Reynar, New York, NY (US)

(73) Assignee: Google Inc., Mountain View, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/858,670

(22) Filed: Apr. 8, 2013

Related U.S. Application Data

(63) Continuation of application No. 11/951,155, filed on Dec. 5, 2007, now Pat. No. 8,417,713.

(51) Int. Cl.
*G06F 17/30* (2006.01)
*G06F 7/00* (2006.01)

(52) U.S. Cl.
CPC ...... *G06F 17/3053* (2013.01); *G06F 17/30864* (2013.01); *G06F 17/30867* (2013.01); *G06F 17/30979* (2013.01)

(58) Field of Classification Search
CPC ............... G06F 17/30864; G06F 17/30867; G06F 17/3053; G06F 17/30979
See application file for complete search history.

(56) References Cited

U.S. PATENT DOCUMENTS

| | | |
|---|---|---|
| 5,832,504 A | 11/1998 | Tripathi et al. |
| 6,226,659 B1 | 5/2001 | Wong et al. |
| 6,611,838 B1 | 8/2003 | Ignat et al. |
| 6,892,179 B1 | 5/2005 | Zacharia |
| 7,139,766 B2 | 11/2006 | Thomson et al. |
| 7,315,848 B2 | 1/2008 | Pearse et al. |
| 7,356,758 B1 | 4/2008 | Bedell et al. |
| 7,523,085 B2 | 4/2009 | Nigam et al. |
| 7,558,769 B2 | 7/2009 | Scott et al. |
| 7,624,093 B2 | 11/2009 | Fortuna |
| 7,685,091 B2 | 3/2010 | Boone et al. |
| 7,720,835 B2 | 5/2010 | Ward et al. |

(Continued)

OTHER PUBLICATIONS

Aue, A. et al, "Customizing Sentiment Classifiers to New Domains: a Case Study," Submitted to RANLP-05, the International Conference on Recent Advances in Natural Language Processing 2005, 6 pages.

(Continued)

*Primary Examiner* — Dung K Chau
(74) *Attorney, Agent, or Firm* — Middleton Reutlinger

(57) ABSTRACT

A method, a system and a computer program product for ranking reviewable entities based on sentiment expressed about the entities. A plurality of review texts are identified wherein each review text references an entity. A plurality of sentiment scores associated with the plurality of review texts are generated, wherein each sentiment score for a review text indicates a sentiment directed to the entity referenced by the review text. A plurality of ranking scores for the plurality of entities are generated wherein each ranking score is based at least in part on one or more sentiment scores associated with one or more review texts referencing the entity. A plurality of search results associated with the plurality of entities are displayed based at least in part on the ranking scores.

25 Claims, 12 Drawing Sheets

(56) References Cited

U.S. PATENT DOCUMENTS

| | | | |
|---|---|---|---|
| 7,756,879 | B2 | 7/2010 | Parsons et al. |
| 7,949,937 | B2 | 5/2011 | Wu |
| 7,996,210 | B2 | 8/2011 | Godbole et al. |
| 8,176,055 | B1 * | 5/2012 | Datar et al. ............ 707/749 |
| 8,554,601 | B1 * | 10/2013 | Marsh et al. ............ 705/7.32 |
| 2003/0004742 | A1 | 1/2003 | Palmer et al. |
| 2006/0026122 | A1 | 2/2006 | Hurwood et al. |
| 2006/0048048 | A1 | 3/2006 | Welcker et al. |
| 2006/0069589 | A1 | 3/2006 | Nigam et al. |
| 2006/0149775 | A1 * | 7/2006 | Egnor ............ 707/102 |
| 2006/0242040 | A1 | 10/2006 | Rader |
| 2007/0016580 | A1 | 1/2007 | Mann et al. |
| 2007/0027672 | A1 | 2/2007 | Decary et al. |
| 2007/0078671 | A1 * | 4/2007 | Dave et al. ............ 705/1 |
| 2007/0078833 | A1 | 4/2007 | Chea et al. |
| 2007/0078849 | A1 * | 4/2007 | Slothouber ............ 707/5 |
| 2007/0143176 | A1 | 6/2007 | Nong et al. |
| 2007/0165904 | A1 * | 7/2007 | Nudd et al. ............ 382/100 |
| 2007/0174343 | A1 | 7/2007 | Fortuna |
| 2007/0226204 | A1 | 9/2007 | Feldman |
| 2007/0266025 | A1 * | 11/2007 | Wagner et al. ............ 707/7 |
| 2007/0294127 | A1 * | 12/2007 | Zivov ............ 705/10 |
| 2008/0005051 | A1 | 1/2008 | Turner et al. |
| 2008/0133488 | A1 * | 6/2008 | Bandaru et al. ............ 707/3 |
| 2008/0154883 | A1 | 6/2008 | Chowdhury et al. |
| 2008/0215571 | A1 | 9/2008 | Huang et al. |
| 2008/0249764 | A1 | 10/2008 | Huang et al. |
| 2008/0288481 | A1 * | 11/2008 | Zeng et al. ............ 707/5 |
| 2009/0048823 | A1 | 2/2009 | Liu et al. |
| 2009/0112892 | A1 | 4/2009 | Cardie et al. |
| 2009/0132953 | A1 * | 5/2009 | Reed et al. ............ 715/781 |
| 2009/0193011 | A1 | 7/2009 | Blair-Goldensohn et al. |
| 2009/0193328 | A1 | 7/2009 | Reis et al. |
| 2009/0248399 | A1 | 10/2009 | Au |
| 2009/0319342 | A1 | 12/2009 | Shilman et al. |
| 2009/0319518 | A1 | 12/2009 | Koudas et al. |

OTHER PUBLICATIONS

Balog, K. et al, "Why are they excited? Identifying and Explaining Spikes in Blog Mood Levels," Proceedings of the 11TH Conference of the European Chapter of the Association for Computational Linguistics: Posters & Demonstrations, 2006, 4 pages, ISLA, University of Amsterdam, Netherlands.

Beineke Philip et al, "An Exploration of Sentiment Summarization," Proceedings of the AAAI Spring Symposium on Exploring Attitude and Affect in Text: Theories and Applications, 2004, 3 pages.

Blitzer, John et al, "Biographies, Bollywood, Boom-boxes and Blenders: Domain Adaptation for Sentiment Classification," Proceedings of the 45th Annual Meeting of the Association for Computational Linguistics, Jun. 23-30, 2007, pp. 440-447.

Carenini, G et al, "Multi-Document Summarization of Evaluative Text," 11th Conference of the European Chapter of the Association for Computational Linguistics, Apr. 3-7, 2006, pp. 305-312.

Carenini, G et al, "Extracting Knowledge from Evaluative Text," Proceedings of the 3rd International Conference on Knowledge Capture, Oct. 2-5, 2005, pp. 11-18, ACM Press.

Choi, Yejin et al, "Identifying Sources of Opinions with Conditional Random Fields and Extraction Patterns," Human Language Technology Conference and Conference on Empirical Methods in Natural Language Processing, Oct. 6-8, 2005, pp. 355-362.

Dave, K. et al, "Mining the Peanut Gallery: Opinion Extraction and Semantic Classification of Product Review," WWW, May 20-24, 2003, pp. 519-528.

Esuli, A. et al, "PageRanking WordNet Synsets: An Application to Opinion Mining," Proceedings of the 45th Annual Meeting of the Association of Computational Linguistics, Jun. 2007, pp. 424-431.

Gamon, Michael et al, "Pulse: Mining Customer Opinions from Free Text," Advances in Intelligent Data Analysis VI, 6th International Symposium on intelligent Data Analysis, IDA 2005, Sep. 8-10, 2005, pp. 121-132.

Gindl, S. et al, "Generic High-Throughput Methods for Multilingual Sentiment Detection," 4th IEEE International Conference on Digital Ecosystems and Technologies, Apr. 12, 2010, Dubai, UAE.

Hu, M. et al, "Mining and summarizing Customer Reviews," Proceedings of the 10th ACM SIGKDD International Conference on Knowledge Discovery and Data Mining, 2004, 10 pages.

Hurst, M., et al, "Retrieving Topical Sentiments from Online Document Collections"; 2004, 8 pages.

Kamps, J. et al, "Using WordNet to Measure Semantic Orientations of Adjectives," Proceedings of the 4th Intenrational Conference on Language Resources and Evaluation, LREC04, 2004, 4 pages.

Kanayama et al, "Fully Automatic Lexicon Expansion for Domain-Oriented Sentiment Analysis"; Jul. 2006, pp. 355-363, Proceedings of the 2006 Conference on Empirical Methods in Natural Language Processing (EMNLP 2006), Sydney.

Kim, S-M et al, "Identifying and Analyzing Judgment Opinions"; Proceedings of the Human Language Technology Conference of the North American Chapter of the ACI, 2006, pp. 200-207.

Kim, S-M et al, "Determining the Sentiment of Opinions," Proceedings of the COLLING Conference, 2004, pp. 1-8, Geneva.

Koppel, M et al, "Good News or Bad News? Let the Market Decide," Dept. of Computer Science, 2006, 5 pages, BarIlan University, Ramat-Gan, Israel.

Lee, L, "A Matter of Opinion: Sentiment Analysis and Business Intelligence (position paper)," Presented at the IBM Faculty Summit on the Architecture of On-Demand Business, May 17-18, 2004, 2 pages, Cornell University.

Lui, B. et al., "Opinion Observer: analyzing and comparing opinions on the Web," Proceedings for the 14th International Conference on World Wide Web, May 10-14, 2005, ACM, pp. 342-351.

Mao, Yi et al, "Isotonic Conditional Random Fields and Local Sentiment Flow," Proceedings of the 20th Annual Conference on Neural Information Processing Systems, Dec. 4-7, 2006, pp. 961-968.

McDonald, Ryan et al, "Structure Models for Fine-to-Coarse Sentiment Analysis," Proceedings of the 45th Annual Meeting of the Association for Computational Linguistics, Jun. 23-30, 2007, pp. 432-439.

Melville, P. et al, "Sentiment Analysis of Blogs by Combining Lexical Knowledge with Text Classification," KDD'09, Jun. 28-Jul. 1, 2009, pp. 1275-1283.

Miller, George A., "WordNet: A Lexical Database for English," Communications of the ACM, Nov. 1995, pp. 39-41, vol. 38, No. 11.

Minqing Hu et al, "Mining Opinion Features in Customer Reviews," Proceedings of the 19th National Conference on Artificial Intelligence (AAAI-04), 2004, pp. 755-760.

Mishne, G et al, "MoodViews: Tools for Blog Mood Analysis," American Associate for Artificial Intelligence, 2006, 2 pages, ISLA, University of Amsterdam, Netherlands.

"Moodgrapher," MoodViews: Tools for Blog Mood Analysis, 2005, 1 page, [archived on web.archive.com Dec. 14, 2007] [online] [Retrieved on Nov. 12, 2010] Retrieved from the Internet URL:http://web.archive.org/web/20071214004346/http://www.moodviews.com/Moodgrapher/.

"MPQA Releases—Corpus and Opinion Recognition System," 2 pages, [archived on web.archive.com on Dec. 6, 2007] [online] [Retrieved on Nov. 12, 2010] Retrieved from the Internet URL:http://web.archive.org/web/20071206160223/http://www.cs.pitt.edu/mpqa/.

Na, J.C. et al, "A Sentiment Based Meta Search Engine," Proceedings of the Asia-Pacific Conference on Library & Informational Education & Practice, Apr. 3-6, 2006, pp. 83-89.

Na, J.C. et al, "Sentiment-Based Search in Digital Libraries," JCDL '05, Jun. 7-11, 2005, pp. 143-144.

Nasukawa, T et al, "Sentiment Analysis: Capturing Favorability Using Natural Language Processing," Proceedings of the 2nd International Conference on Knowledge Capture, 2003, pp. 70-77, Sanibel Island, Florida, USA.

Nielsen Buzzmetrics: The Global Measurement of Standard in Consumer-Generated Media, BuzzMetrics, 2007, 1 page, [Archived on web.archive.com on Dec. 10, 2007] [online] [Retrieved on Nov. 12, 2010] Retrieved from the Internet URL:http://web.archive.org/web/20071210041849/http://www.nielsenbuzzmetrics.com/.

(56) References Cited

OTHER PUBLICATIONS

Opinmind.com, 1 page [Archived on web.archive.com on Dec. 23, 2007] [online] [Retrieved on Nov. 12, 2010] Retrieved from the Internet URL:http://web.archive.org/web/20071223003722/http://www.opinmind.com/.

Pang, B et al, "A Sentimental Education: Sentiment Analysis Using Subjectivity Summarization Based on Minimum Cuts," ACL '04 Proceedings of the 42nd Annual Meeting on Association for Computational Linguistics, 2004, 8 pages, Dept. of Computer Science, Cornell University, Ithaca, NY.

Pang, Bo et al, "Thumbs Up? Sentiment Classification Using Machine Learning Techniques," Proceedings of the 2002 Conference on Empirical Methods in Natural Language Processing, Jul. 6-7, 2002, pp. 79-86.

Pang, Bo, "Automatic Analysis of Document Sentiment," A Dissertation Presented to the Faculty of the Graduate School of Cornell University in Partial Fulfillment of the Requirements for the Degree of Doctor of Philosophy, Aug. 2006, 138 pages.

Popescu, A. et al, "OPINE: Extracting Product Features and Opinions from Reviews," Human Language Technology Conference and Conference on Empirical Methods in Natural Language Processing, Oct. 6-8, 2005, pp. 32-33.

Popescu, A. et al, "OPINE: Mining Product Reviews," 1 page [Archived on web.archive.com on Jan. 14, 2008] [online] [Retrieved on Nov. 12, 2010] Retrieved from the Internet <URL:http://web.archive.org/web/20080114065434/http://www.cs.washington.edu/research/knowitall/opine/>.

Rottentomatoes.com, 1998, 2 pages, [Archived on web.archive.com on Dec. 5, 2007] [online] [Retrieved on Nov. 12, 2010] Retrieved from the Internet URL:htpp://web.archive.org/web/20071205114734/http://www.rottentomatoes.com/.

Snyder Benjamin et al, "Multiple Aspect Ranking Using the Good Grief Algorithm," Human Language Technologies 2007: The Conference of the North American Chapter of the Association for Computational Linguistics, Apr. 22-207, 2007, pp. 300-307.

Tan, S. et al, "A Novel Scheme for Domain-Transfer Problem in the context of Sentiment Analysis," Proceedings of the 16th ACM Conference on Information and Knowledge Management, 2007, pp. 979-982.

Tang, H. et al, "A Survey on Sentiment Detection of Reviews," Expert Systems with Applications, vol. 36, Issue 7, Sep. 2009, pp. 10760-10773.

Textmap.com, "The entity search engine." 1 page, 2007 [Archived on web.archive.com on Dec. 27, 2007] [online] [Retrieved on Nov. 12, 2010] Retrieved from the Internet URL:http://web.archive.corg/web/20071227081734/http://textmap.com/.

Turney, Peter D, "Thumbs Up or Thumbs Down? Semantic Orientation Applied to Unsupervised Classification of Reviews," Proceedings of the 40th Annual Meeting of the Association for Computational Linguistics (ACL), Jul. 2002, pp. 417-424.

Wiebe, Janyce M., "Learning Subjective Adjectives from Corpora," Proceedings of the 17th National Conference on Artificial Intelligence (AAAI-2000), 2000, pp. 735-740.

Yi, J et al, "Sentiment Analyzer: Extracting Sentiments About a Given Topic Using Natural Language Processing Techniques"; Proceedings of the 3rd IEEE International Conference on Data Mining, 2003, 8 pages.

Zhuang, Li et al, "Movie Review Mining and Summarization," ACM 15th Conference on Information and Knowledge Management, Nov. 6-11, 2006, pp. 43-50.

* cited by examiner

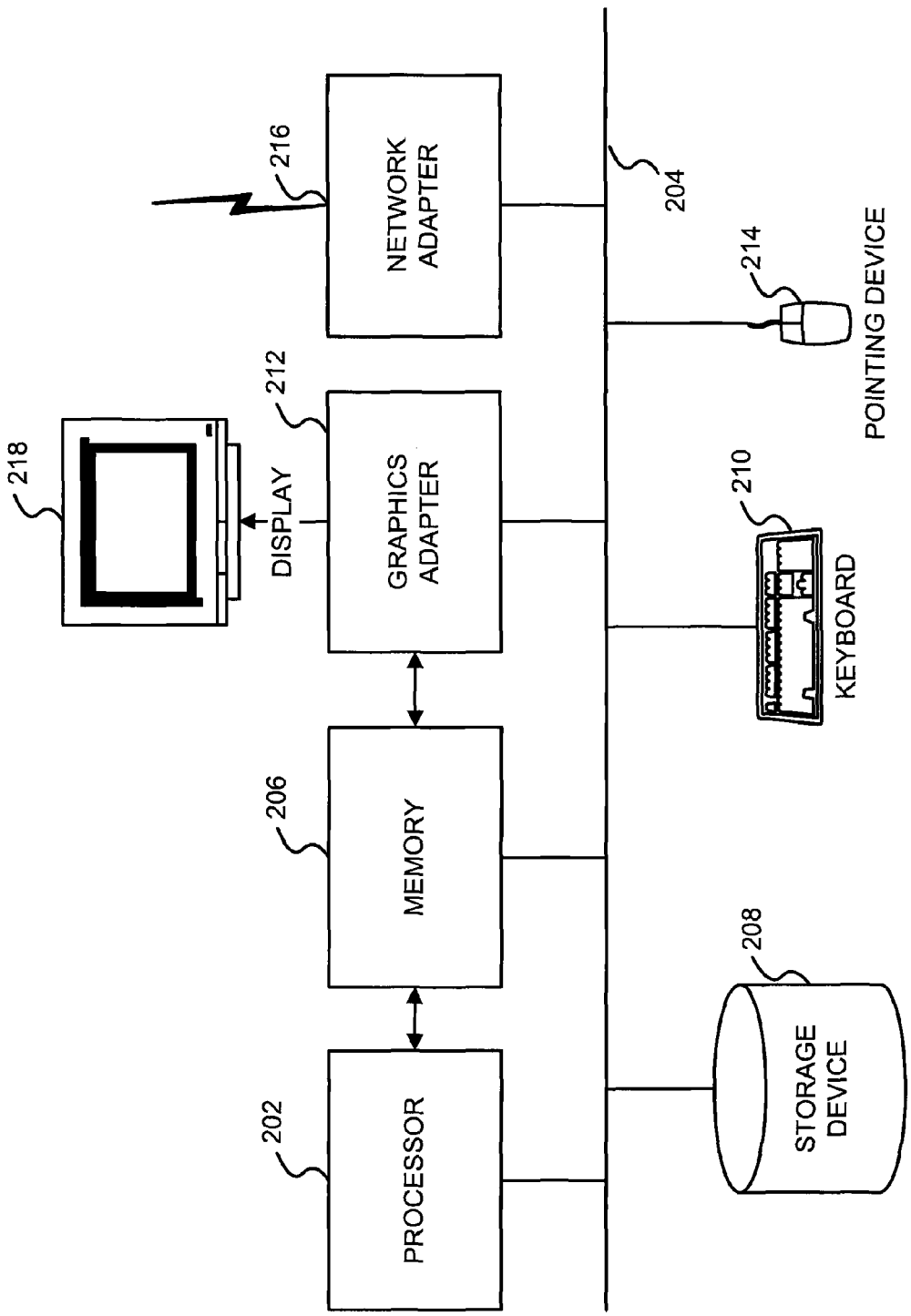

| 300 Entity Type | 302 Entity ID | 404 Entity Ranking | 406 User Interaction Score | 408 User Interaction Score Weight | 410 Consensus Sentiment Score | 412 Sentiment Score Weight | 414 Consensus Normalized Rating | 416 Normalized Rating Weight |
|---|---|---|---|---|---|---|---|---|
| | | | | | | | | |
| | | | | | | | | |
| | | | | | | | | |

Columns 406–416 grouped as 415.

FIG. 4

SENTIMENT DETECTION AS A RANKING SIGNAL FOR REVIEWABLE ENTITIES

CROSS-REFERENCE TO RELATED APPLICATIONS

This application is a continuation under 35 U.S.C. §120 of U.S. patent application Ser. No. 11/951,155, filed Dec. 5, 2007, and entitled "Sentiment Detection as a Ranking Signal for Reviewable Entities", which is incorporated by reference herein in its entirety. The present application is related to U.S. patent application Ser. No. 11/844,222 "Domain-Specific Sentiment Classification" filed Aug. 23, 2007, the disclosure of which is incorporated herein by reference.

BACKGROUND

1. Field

This invention pertains in general to natural language processing and in particular to automated sentiment classification to provide rankings of documents.

2. Description of the Related Art

Determining indicators of search result relevance and ranking the search results according to these indicators is an integral function of web search engines. Common indicators of search result relevance include indicators of popularity such as number of links to a web page or number of page hits a day. Other indicators of popularity may be collected through monitoring user-interaction with search results. Monitoring user-interaction with search results produces metrics which indicate search result relevance such as user click through rates or average time spent by the user at a web page associated with a search result.

Often searches are performed for entities about which public opinion is expressed such as movies, restaurants and hotels. This opinion or sentiment is also a valuable indicator of the relevance of search results. For instance, if a user searches for French restaurants, it is most likely that a user would like to know of the restaurants that are the most favorably reviewed. Similarly, most users who search for a listing of hotels in a geographic area wish to see results containing the hotels with the best reviews. Users may be interested in search results for reviewable entities such as books and films for which strong public opinion is expressed, whether or not the opinion is favorable or unfavorable.

Attempts to use sentiment as a ranking signal for search results have commonly used structured reviews. In structured reviews, the reviewer selects a rating in addition to providing a textual review of the entity. Structured reviews can be conveniently used in ranking systems as most structured reviews use a numeric rating (e.g. a 5 star system or a scale of 1 to 10) that can easily be used to rank results. Results are ranked by their average numeric rating from the structured review. However, in instances where an entity has mixed reviews valuable information may be lost due to the averaging.

Another limitation of solely using ratings from structured reviews as indicators of search result relevance is that valuable information in the textual review regarding the sentiment or public opinion about the reviewable entities is discarded. In textual reviews sentiment is expressed through statement, allowing a finer level of precision or "granularity" than rankings and the ability to express different types of sentiment within a review (e.g. "food great, service bad").

Textual reviews may also help correct for inconsistencies in ranking system normalization. For instance, a restaurant consistently rated at two stars by restaurant reviewers may be favorably reviewed by its patrons due to differences in ranking system scales. Incorporating the sentiment expressed within the textual reviews that accompany the ratings from both reviewers and patrons can help correct for these inconsistencies. Additionally, there are many other textual sources of sentiment outside of structured reviews such as blogs or personal web pages that may not be integrated into search result rankings based solely on structured ratings.

BRIEF SUMMARY

The described embodiments provide a method, system and computer program product that generate ranking scores used to rank a plurality of reviewable entities.

One aspect provides a computer-implemented method of ranking reviewable entities. A plurality of review texts is identified, wherein each review text references an entity. A plurality of sentiment scores associated with the plurality of review texts are generated, wherein each sentiment score for a review text indicates a sentiment directed to the entity referenced by the review text. A plurality of ranking scores for the plurality of entities are generated wherein each ranking score is based at least in part on one or more sentiment scores associated with one or more review texts referencing the entity. The plurality of ranking scores are then stored.

In another aspect, the described embodiments provide a system for ranking reviewable entities. The system comprises a text selection module adapted to identify a plurality of review texts, wherein each review text references an entity. The system further comprises a sentiment score module adapted to generate a plurality of sentiment scores associated with the plurality of review texts, wherein each sentiment score for a review text indicates a sentiment directed to the entity referenced by the review text. The system further comprises a rank learning model adapted to generate a plurality of ranking scores for the plurality of entities wherein each ranking score is based at least in part on one or more sentiment scores associated with one or more review texts referencing the entity and store the plurality of ranking scores in a ranking database.

Another aspect is embodied as a computer-readable storage medium on which is encoded computer program code for ranking reviewable entities according to the above described method.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 2 is a high-level block diagram illustrating a functional view of a typical computer for use as the analysis engine and/or data repository illustrated in the environment of FIG. 1 according to one embodiment.

FIG. 4 illustrates the storage of the ranking data generated by the Ranking Analysis Engine 130.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

I. Overview

Figure 1:
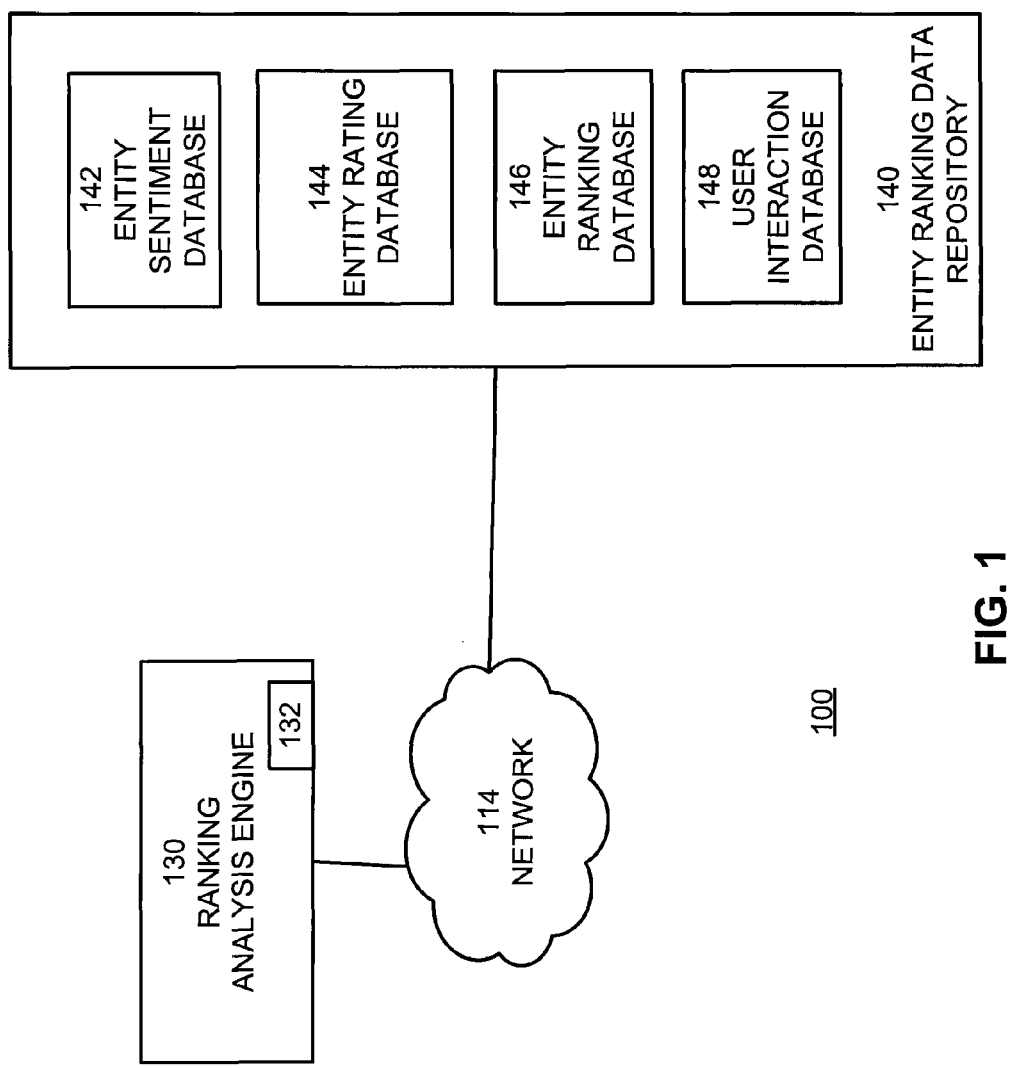
FIG. 1 is a high-level block diagram of a computing environment according to one embodiment of the present invention.

FIG. 1 is a high-level block diagram of a computing environment 100 according to one embodiment. FIG. 1 illustrates an Entity Ranking Data Repository 140, and a Ranking Analysis Engine 130 connected to a Network 114. Although FIG. 1 illustrates the Ranking Analysis Engine 130 as a single engine, in some embodiments the Ranking Analysis Engine 130 can have multiple engines. Likewise, there can be multiple Entity Ranking Data Repositories 140 on the Network 114. Only one of each entity is illustrated in order to simplify and clarify the present description. There can be other entities on the Network 114 as well. In some embodiments, the Ranking Analysis Engine 130 and Entity Ranking Data Repository 140 are combined into a single entity.

The Ranking Analysis Engine 130 supports ranking of documents associated with reviewable entities. The Ranking Analysis Engine 130 uses the reviews stored in the Entity Sentiment Database 142 to identify text regarding entities. The Ranking Analysis Engine 130 is adapted to generate sentiment scores based on sentiment in the text regarding the entities. The Ranking Analysis Engine stores entity rankings generated based on sentiment scores in the Entity Ranking Database 146. The Ranking Analysis Engine 130 also functions to modify the rankings in the Entity Ranking Database 146 based on the Entity Rating Database 144. The Ranking Analysis Engine 130 is further adapted to modify the rankings in the Entity Ranking Database 146 based on a User Interaction Database 148. In one embodiment, the Ranking Analysis Engine 130 learns and stores weights used to modify the rankings as a mixture model 132.

The Entity Ranking Data Repository 140 stores structured reviews, unstructured reviews and other data used to rank search results for Reviewable Entities 315. Reviewable Entities 315 include any person, place or thing about which opinion is likely to be expressed such as restaurants, hotels, consumer products such as electronics, films, books and live performances.

Structured reviews are known reviews of the Reviewable Entity 315 which adhere to a specific format including a defined rating of the reviewable entity and/or a textual review of the Reviewable Entity 315. A structured review will typically have the following format, "0 stars; The pizza was horrible. Never going there again.". In this instance, "0 stars" corresponds to the rating and "The pizza was horrible. Never going there again" corresponds to the Textual Review 310. Structured reviews are collected through the Network 114 from known review web sites such as Google Maps, TripAdvisor, Citysearch or Yelp. Structured reviews can also be collected from other types of textual documents such as the text of books, newspapers and magazines.

Unstructured reviews are textual documents which reference the Reviewable Entity 315 that have a high likelihood of containing an opinion about the Reviewable Entity 315. Unstructured reviews contain a Textual Review 310 but not a rating. Unstructured reviews usually contain sentiment expressed in documents with less structured formats than review websites such as newsgroups or blogs. Unstructured reviews are obtained through the Network 114 from sources of textual information which reference the entities including, but not limited to, web pages and/or portions of web pages, blogs, emails, newsgroup postings, and/or other electronic messages, etc. In some embodiments, unstructured reviews are analyzed to produce values which indicate the likelihood that the unstructured review pertains to the Reviewable Entity 315 and the unstructured review contains a sentiment or opinion about the Reviewable Entity 315

In one embodiment, the Entity Ranking Data Repository 140 stores textual reviews from structured and unstructured reviews of the Reviewable Entity 315 in the Entity Sentiment Database 142 and ratings of the entity from structured reviews in the Entity Ratings Database 144. In alternate embodiments, the textual reviews from structured and unstructured reviews of the reviewable entity and entity ratings may be stored in one corpus. According to the embodiment, the Entity Sentiment Database 142 may store a value which indicates the likelihood that an unstructured textual review contains an opinion or sentiment about the reviewable entity. In some embodiments, the Entity Sentiment Database 142 also contains a value which indicates the likelihood that the unstructured review pertains to the entity. In some embodiments, the ratings in the Entity Ratings Database 144 are normalized to a specified value.

The Entity Ranking Data Repository 140 further stores a User Interaction Database 148. The User Interaction Database 148 stores user interaction metrics generated from monitoring user interactions with search results associated with entities.

The Entity Ranking Data Repository 140 further stores an Entity Ranking Database 146. The Entity Ranking Database 146 combines and stores information from the Entity Sentiment Database 142, the Entity Rating Database 144 and the User Interaction Database 148 used to rank the reviewable entities.

The Network 114 represents the communication pathways among the Ranking Analysis Engine 130, the Entity Ranking Data Repository 140, and any other entities connected to the Network 114. In one embodiment, the Network 114 is the Internet. The Network 114 can also utilize dedicated or private communications links that are not necessarily part of the Internet. In one embodiment, the Network 114 uses standard communications technologies and/or protocols. Thus, the Network 114 can include links using technologies such as Ethernet, 802.11, integrated services digital network (ISDN), digital subscriber line (DSL), asynchronous transfer mode (ATM), etc. Similarly, the networking protocols used on the Network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the Network 114 can be represented using technologies and/or formats including the HTML, the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). In other embodiments, the Sentiment Analysis Engine 110 and Sentiment Analysis Data Repository 112 use custom and/or dedicated data communications technologies instead of, or in addition to, the ones described above.

FIG. 2 is a high-level block diagram illustrating a functional view of a typical computer 200 for use as the Ranking Analysis Engine 130 and/or Entity Ranking Data Repository 140 illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the Network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 used by the entities of FIG. 1 can vary depending upon the embodiment and the processing power required by the entity. The Ranking Analysis Engine 130 can include one or more distributed physical or logical computers operating together to provide the functionalities described herein. Likewise, the data repository can be provided by a storage area network (SAN), database management system (DBMS), or another storage system. The computers 200 can lack some of the components described above, such as keyboards 210, graphics adapters 212, and displays 218.

Figure 3A:
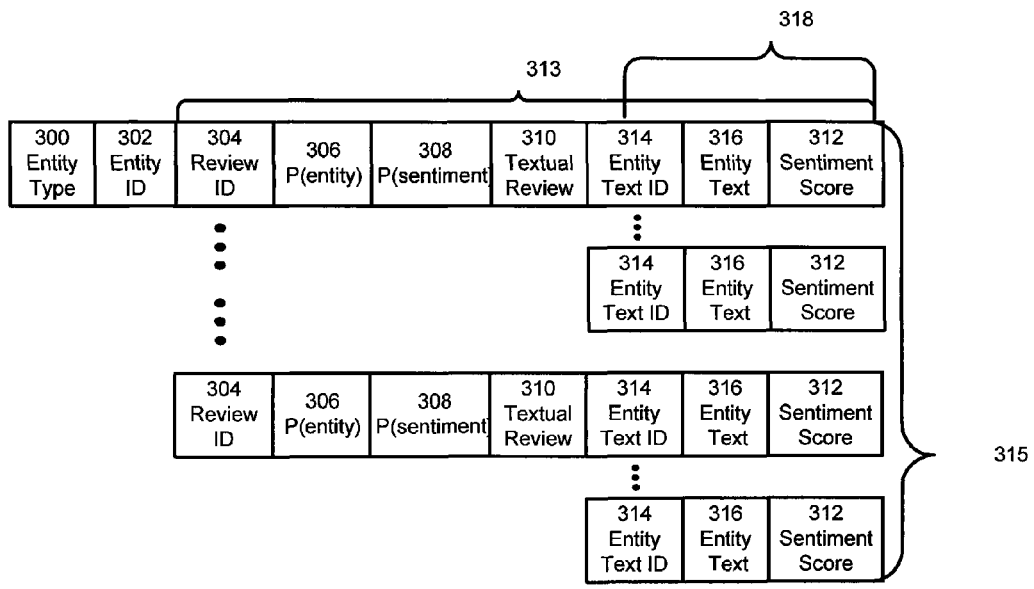
FIG. 3A illustrates the storage of sentiment data associated with textual reviews of a reviewable entity in the Entity Sentiment Database 142 according to one embodiment.

FIG. 3A illustrates the storage in memory of sentiment data associated with textual reviews of a Reviewable Entity 315 in the Entity Sentiment Database 142 according to one embodiment. Each Reviewable Entity 315 is represented by a tuple in the Entity Sentiment Database 142. A tuple consists of an Entity ID 302, an Entity Type 300 and one or more Reviews 313. Each Review 313 consists of a Review ID 204, a P(entity) value 306, a P(sentiment) value 308, and one or more Entity Review Texts 318. Each Entity Review Text 318 contains an Entity Text ID 314, Entity Text 316 and a Sentiment Score 312. The Entity ID 302 be any kind of unique identifier that uniquely identifies (e.g., a primary key in the Entity Sentiment Database 142) the Reviewable Entity 315, such as an alphanumeric string, bit string, or a combination of data associated with the Reviewable Entity 315 such as name, location or owner of the Reviewable Entity 315.

Entity Type 300 is a categorical variable used to define the type of the Reviewable Entity 315 in order to facilitate Entity Type 300 specific search and specify the domain to be used in Domain-Specific Sentiment Analysis. The Entity Type 300 can represent any type of Reviewable Entity 315 such as a place, service or consumer product. Example Entity Types 300 may include hotels, films, restaurants and cameras. In alternate embodiments, there may be more than one Event Type 300 associated with each Reviewable Entity 315.

The Review ID 304 can be any unique identifier which uniquely identifies the Review 313 (e.g. a primary key in the Entity Sentiment Database 142). The Review ID 304 may include any combination of information which uniquely identifies the Review 313 including the author of the Review 313, the source from which the Review 313 was obtained and the date of the Review 313.

The P(entity) value 306 represents the likelihood that the Review 313 is about the Entity 315. For Reviews 313 including Textural Reviews 310 from unstructured reviews, the P(entity) value 306 can be a function of any information regarding the Review 313 such as the source of the Review 313 or the author of the Review 313. The P(entity) value 306 can also be determined based on any metric generated from the analysis of the Textual Review 310, such as the number of times the entity is mentioned in the Textual Review 310 or a title of the Textual Review 310. According to the embodiment, the P(entity) value 306 may be a categorical (high, medium, low) or a numeric value. For Reviews 313 obtained from high quality or structured reviews, the P(entity) value 306 may be set to the corresponding numeric or categorical value which denotes the highest likelihood that the Review 313 pertains to the Entity 315.

The P(sentiment) value 308 represents the likelihood that the Review 313 contains a sentiment about the Entity 315. For Reviews 313 including Textual Reviews 310 from unstructured reviews, the P(sentiment) value 306 can be a function of any information regarding the entity such as the source of the Review 313 or the author of the Review 313. The P(sentiment) value 308 can also be determined based on any metric generated from the analysis of the Textual Review 310, such as the number of tokens representing adjectives in the Textual Review 310. According to the embodiment, the P(sentiment) value 306 may be a categorical (e.g. high, medium, low) or a numeric value. For Reviews 313 including Textural Reviews 310 from high quality or structured reviews, the P(sentiment) value may be set to the corresponding numeric or categorical values which denotes the highest likelihood that the Review 313 pertains to the Reviewable Entity 315. For example, a P(sentiment) value from an Review 313 obtained from a review website such as Yelp or TripAdvisor would be given a P(sentiment) value of 1 or 100%, indicating the highest likelihood that the Review 313 contained sentiment about the entity.

The Textual Review 310 includes the body of text that has been identified as a Review 313 of the Entity 315. In one embodiment, the Textual Review 310 is tokenized to produce a set of tokens and each token is subject to part of speech (POS) tagging to associate parts of speech with the tokens. In some embodiments, the tokens comprising the Textural Review 310 are processed using a variety of natural language processing (NLP) techniques such as stemming, word sense disambiguation and compound recognition. Other applicable techniques will be apparent to those skilled in the art of natural language processing (NLP).

The Ranking Analysis Engine 130 processes each Textual Review 310 to create one or more Entity Review Texts 318. Each Entity Review Text 318 comprises an Entity Text ID 314, an Entity Text 316 and a Sentiment Score 312. The Entity Text ID 314 is a unique identifier used to identify the Entity Review Text 318. The Entity Text 316 is the portion of the Textual Review 310 which contains sentiment about the Reviewable Entity 315. The Ranking Analysis Engine 130 identifies one or more Entity Texts 316 from the Textual Review 310. The identification of Entity Review Texts 318 is discussed in detail below with respect to the Text Selection Module 502 in FIG. 5.

The Ranking Analysis Engine 130 generates Sentiment Scores 312 for each Entity Text 316. Sentiment Scores 312 are used to represent the type of sentiment contained in the Entity Texts 316 and the magnitude or strength of the type of sentiment in the Entity Texts 316. The type of sentiment represents any kind of characterization of a sentiment that can associated with heuristics used to score the sentiment according to the characterization such as: polarity of the sentiment, the type of attitude expressed in the sentiment, confidence in the sentiment, identity of the source/author, overall amount of sentiment-laden text identified, and relative importance of features about which sentiment is expressed.

Polarity of a sentiment defines whether it is a positive or negative sentiment. Heuristics used to score sentiments based on polarity are based on the sentiment containing synonyms of words that indicate polarity such as "good" or "bad". In one embodiment, the generated Sentiment Scores 312 partition sentiments into two categories according to the polarity (i.e. positive or negative) of the sentiment.

Magnitude of sentiment is expressed as a value on a scale of 1 to 5 and represents the strength of the associated type of sentiment. In embodiments, where Sentiment Scores 312 are generated based on polarity, magnitude of sentiment and polarity of sentiment are combined to create a scale in which −5 represents the strongest negative sentiment; −1 represents the weakest negative sentiment; +1 represents the weakest positive sentiment and +5 represents the strongest positive sentiment.

In alternate embodiments, separate Sentiment Scores 312 are generated to represent type of sentiment and polarity of sentiment. Other representations of type of sentiment and magnitude of sentiment will be well known to those skilled in the art. For example, other representations may further partition sentiment into multiple types of sentiment or use different scales or categorical variables to represent magnitude.

Figure 3B:
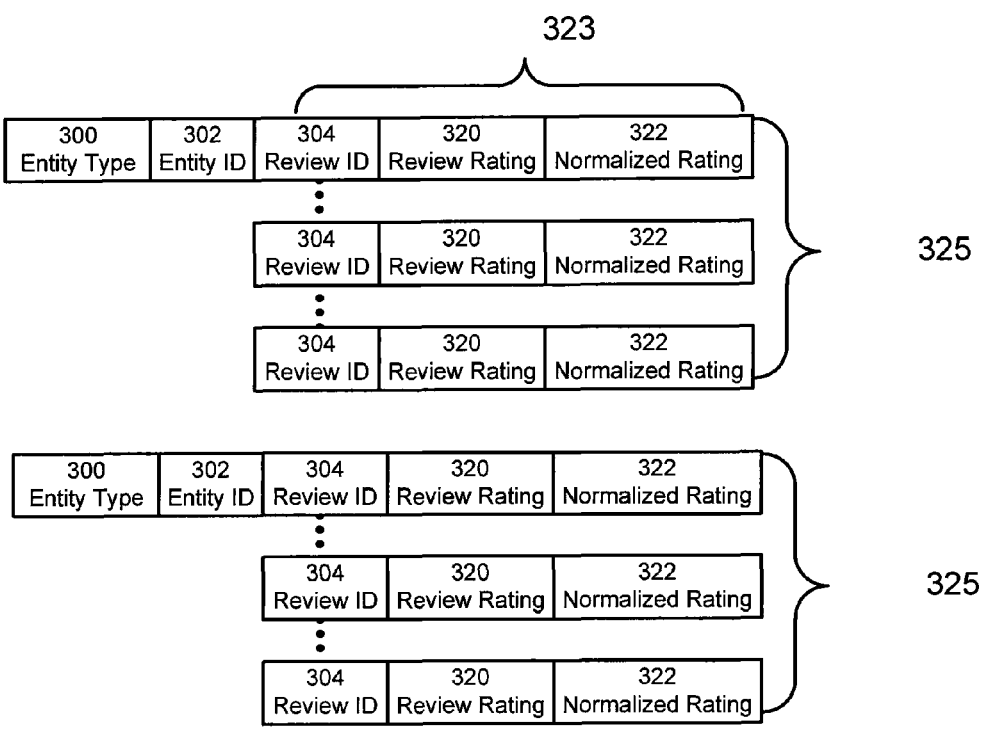
FIG. 3B illustrates the storage of rating data from structured reviews of an entity in the Entity Rating Database 144 according to one embodiment.

FIG. 3B illustrates the storage of rating data from structured reviews of an entity in the Entity Rating Database 144 according to one embodiment. Each Rated Entity 325 is represented by a tuple in the Entity Rating Database 144. The Rated Entity 325 tuple consists of an Entity ID 302, an Entity Type 300 and one or more Ratings 323. Each Rating 232 consists of a Review ID 304, a Review Rating 320 and a Normalized Rating 322.

The Review Rating 320 is the rating assigned in a structured review. The Review Rating 320 includes both the rating scale and the numeric value of the rating. The rating scale can be a set of ordered categorical variables (e.g. A+ through F) or a numeric scale (5 star system, scale of 1-10). Some rating scales include negative values. Ratings 323 with multiple different rating scales are normalized to create Normalized Ratings 322 in which the Ratings 323 have the same numeric scale. In one embodiment, simple linear normalization is performed by representing all the ratings on a specified scale. Other methods of normalization will be apparent to those skilled in the art in light of this disclosure.

FIG. 4 illustrates the storage of the ranking data generated by the Ranking Analysis Engine 130. Each Ranked Entity 415 is represented by a tuple in the Entity Ranking Database 146. Each tuple contains the Entity Type 300, Entity ID 302, Entity Ranking 404, User Interaction Score 406, User Interaction Score Weight 408, Consensus Sentiment Score 410, Sentiment Score Weight 412, Consensus Normalized Rating 414 and Normalized Rating Weight 416. In some embodiments, Ranked Entities 415 are organized by Entity Type 200 to facilitate search result retrieval for queries preformed for an Entity Type 200.

The Ranked Entities 415 in the Entity Ranking Database 146 are displayed responsive to search queries which reference the Entity Type 302. The Entity Rankings 404 are used as signals to rank the set of Ranked Entities 415 when displaying the Ranked Entities 415 as search results. For example, a user who enters "sushi" as a search query will receive an ordered list of Ranked Entities 415 of Entity Type 415 "sushi restaurant" ranked according to Entity Ranking 404. According to the embodiment, the Entity Ranking 404 can be combined with other signals to rank the set of Ranked Entities 415 such as signals based on the number of times the Ranked Entity 415 is mentioned on an index of web pages or the geographic location of the Ranked Entities 415 relative to a geographic location of a user performing a search.

The User Interaction Score 406 is generated using user interaction metrics such as user click through and time spent at web pages associated with Ranked Entities 415 presented in search results. The Ranking Analysis Engine 130 monitors user interaction with results to generate user interaction metrics which are stored in the User Interaction Database 148. This process is discussed in detail below with respect to step 712 in FIG. 7. The User Interaction Score Weight 408 is the weight assigned to the User Interaction Score 406 in calculating the Entity Ranking 404.

The Consensus Sentiment Score 410 of a Ranked Entity 415 is a representative sentiment score which combines the values of all calculated Sentiment Scores 312 associated with an Entity 315. Sentiment Scores 312 associated with a Ranked Entity 315 may be combined in any way to generate a Consensus Sentiment Score 410. Consensus Sentiment Scores 410 can be generated by averaging the Sentiment Scores 312 associated with a Reviewable Entity 315, selecting the median Sentiment Score 312 of the Sentiment Scores 312 associated with a Reviewable Entity 315 or selecting the Sentiment Score 312 which is most frequently associated with a Reviewable Entity 315. The Sentiment Scores 312 of Reviews 313 with Textual Reviews 310 from unstructured reviews may be weighted using the P(entity) value 306 and the P(sentiment) value 308. Other methods of generating a Consensus Sentiment Score 410 from a plurality of Sentiment Scores 312 associated with a Reviewable Entity 315 will be apparent to those skilled in the art. The Sentiment Score Weight 412 is the weight assigned to the Consensus Sentiment Score 410 in calculating the Entity Ranking 404.

The Consensus Normalized Rating 414 is a representative rating which combines the values of all calculated Normalized Ratings 322 associated with a Ranked Entity 325. Normalized Ratings 322 associated with a Ranked Entity 325 may be combined in any way to generate a Consensus Normalized Rating 414. Consensus Normalized Ratings 414 can be generated by averaging the Normalized Ratings 322 associated with a Ranked Entity 325, selecting the median Normalized Rating 322 associated with a Ranked Entity 325 or selecting the Normalized Rating 322 which is most frequently associated with a Ranked Entity 325. Other methods of generating a Consensus Normalized Rating 414 from a plurality of Normalized Ratings 322 associated with a Ranked Entity 325 will be apparent to those skilled in the art. The Normalized Rating Weight 416 is the weight assigned to the Consensus Normalized Rating 414 for generating the Entity Ranking 404.

Figure 5:
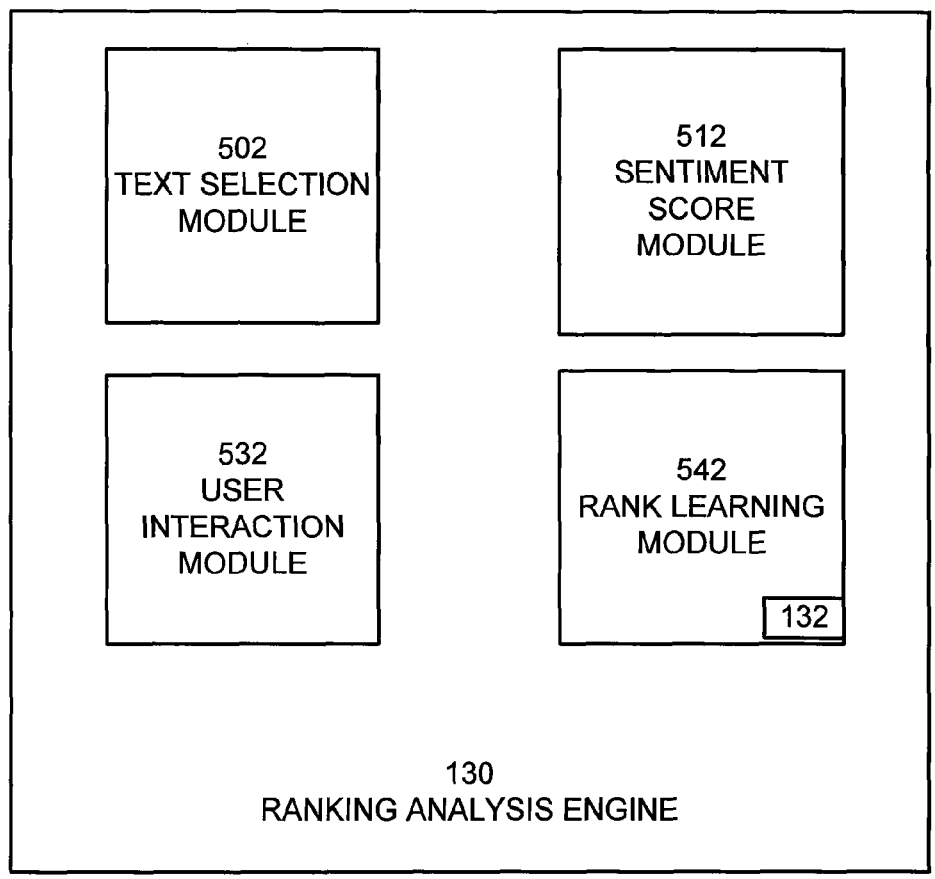
FIG. 5 is a high-level block diagram illustrating modules within the Ranking Analysis Engine 130 according to one embodiment.

FIG. 5 is a high-level block diagram illustrating modules within the Ranking Analysis Engine 130 according to one embodiment.

A Text Selection Module 502 is used to identify one or more Reviewable Entity Texts 318 from the Textual Review 310 and store the Reviewable Entity Texts 318 in the Entity Sentiment Database 142. In one embodiment, the Text Selection Module 502 runs as a batch program whenever new Reviews 313 are added to the Entity Sentiment Database 142.

The Sentiment Score Module 512 generates Sentiment Scores 312 for each Entity Text 316. In one embodiment, the Sentiment Score Module 512 is run as a batch program in association with the Text Selection Module 502 whenever new Reviews 313 are added to the Entity Sentiment Database 142.

The User Interaction Module 532 functions to monitor user interactions with ranked search results for an Entity Type 300. The User Interaction Module 532 further stores monitoring information in the User Interaction Database 148. Monitoring user interaction with ranked search results is discussed in detail below with respect to step 712 in FIG. 7.

The Rank Learning Module 542 functions to learn weights for generating Entity Rankings 404 based on user-interaction metrics stored in the User Interaction Database 148. In one embodiment, the Rank Learning Module 542 iteratively learns and stores a mixture model 132 to generate weights for generating Entity Rankings 404.

Figure 6:
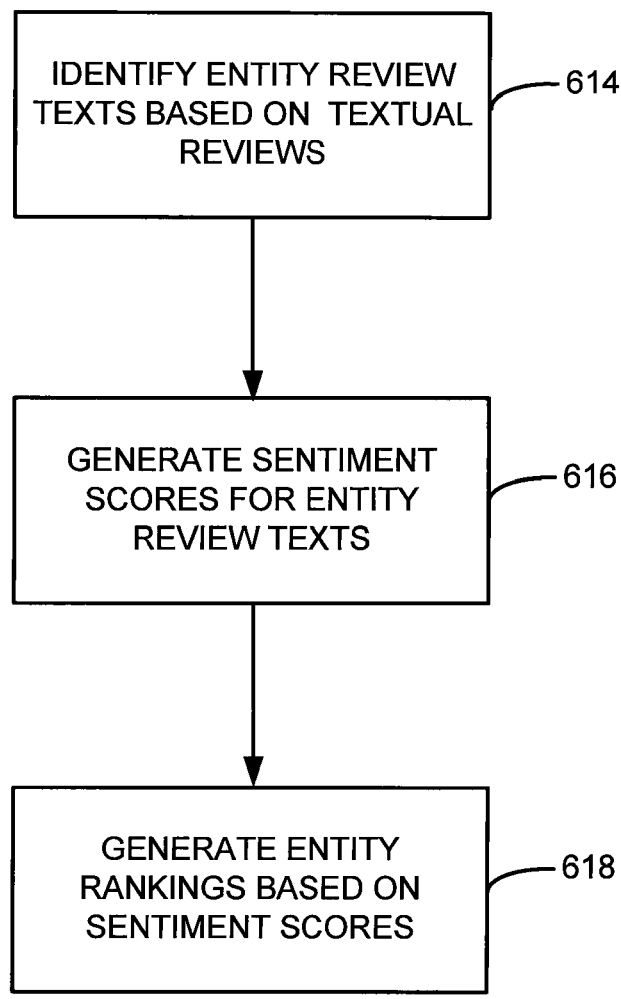
FIG. 6 is a flowchart illustrating a more detailed view of steps performed by an embodiment of the Ranking Analysis Engine 130 in generating Sentiment Scores 312 and initial Entity Rankings 404 based on the generated Sentiment Scores 312.

FIG. 6 is a flowchart illustrating a more detailed view of steps performed by an embodiment of the Ranking Analysis Engine 130 in generating Sentiment Scores 312 and initial Entity Rankings 404 based on the generated Sentiment Scores 312. Other embodiments perform additional and/or different steps that the ones described in the figure. In addition, other embodiments perform the steps in different orders and/or perform multiple steps concurrently.

A Text Selection Module 502 identifies 614 one or more Entity Texts 316 from the Textual Review 310. The Text Selection Module 502 first identifies 614 one or more tokens corresponding to the Reviewable Entity 315 in each Textual Review 310. The Text Selection Module 502 then identifies 614 one or more Entity Texts 316 by identifying 614 a set of tokens proximate to the token corresponding to the Reviewable Entity 315. In some embodiments, the set of tokens in each Entity Text 316 is of fixed size for all Textual Reviews 310. In a specific embodiment, the set of tokens in each Entity Text 316 will correspond to 2 sentences adjacent to (i.e. before and after) the sentence containing the token corresponding to the Reviewable Entity 315.

In an alternate embodiment, the set of tokens in each Entity Text 316 will be proportional to one or both of the P(entity) 306 value and the P(sentiment) 308 value. For instance, if the P(entity) value 306 or the P(sentiment) value 308 is low indicating a low likelihood that the Textual Review 310 is regarding the entity or contains sentiment about the entity, the set of tokens in the Entity Text 316 will be a smaller number of tokens than the set of tokens in the Entity Text 316 associated with a Textual Review 310 with a high P(entity) value 306 or P(sentiment) value 308.

The Sentiment Score Module 512 generates 616 Sentiment Scores 312 representing the polarity and magnitude of sentiment in each of the Entity Review Texts 318. The Sentiment Score Module 512 generates domain specific Sentiment Scores 312 based on the Entity Texts 316 and the Entity Types 300 which specify the domain of the entity. Suitable methods of generating domain-specific Sentiment Scores 312 are discussed below in reference to FIGS. 8-12.

The Rank Learning Module 532 generates 618 Entity Rankings 404 based on the Sentiment Scores 312. The Rank Learning Module 542 combines the Sentiment Scores 312 associated with each Reviewable Entity 315 to generate 618 the Consensus Sentiment Score 410 used to generate 618 the Entity Ranking 404. Entity ID 302 is used to create a correspondence between the Ranked Entities 415, the Rated Entities 425 and the Reviewable Entities 315. In one embodiment, the User Interaction Score Weight 408 and the Normalized Rating Score Weight 416 are set to zero, meaning that the Entity Ranking 404 is generated 618 based solely on the Consensus Sentiment Score 410. This weighting is also used to initialize the Entity Ranking Database 146 in embodiments which monitor user interactions to iteratively learn the User Interaction Score Weights 408, Normalized Rating Score Weights 416 and the Sentiment Score Weights 412.

In an alternate embodiment, the Entity Ranking 404 is generated 618 based on both the Consensus Sentiment Score 410 and the Consensus Normalized Rating 414 with the corresponding Sentiment Score Weight 412 and Normalized Rating Weight 416 both set to values greater than zero. The values of the Sentiment Score Weight 412 and the Normalized Rating Weight can be user-specified. Alternately, these values may be learned based on information in the User Interaction Database 148.

According to the embodiment, the Entity Ranking 404 may be based on any combination of the polarity and magnitude of the Consensus Sentiment Scores 312 associated with the Ranked Entities 315. In one embodiment, the Ranked Entities 315 with the strongest positive Consensus Sentiment Scores 410 will have the highest Entity Rankings 404 and the Ranked Entities 415 with the strongest negative Consensus Sentiment Scores 410 will have the lowest Entity Rankings 404. In another embodiment, the Ranked Entities 315 with the strongest negative Consensus Sentiment Scores 410 will have the highest Entity Rankings 404 and the Ranked Entities 415 with the strongest positive Consensus Sentiment Scores 410 will have the lowest Entity Rankings 404. In another embodiment, the Entity Rankings 404 may be based solely on the magnitude of the Sentiment Scores 312, wherein Ranked Entities 415 with the strongest positive and negative Consensus Sentiment Scores 410 are assigned the highest Entity Rankings 404 and the Ranked Entities 415 with the weakest positive and negative Consensus Sentiment Scores 410 are assigned the lowest Entity Rankings 404.

Figure 7:
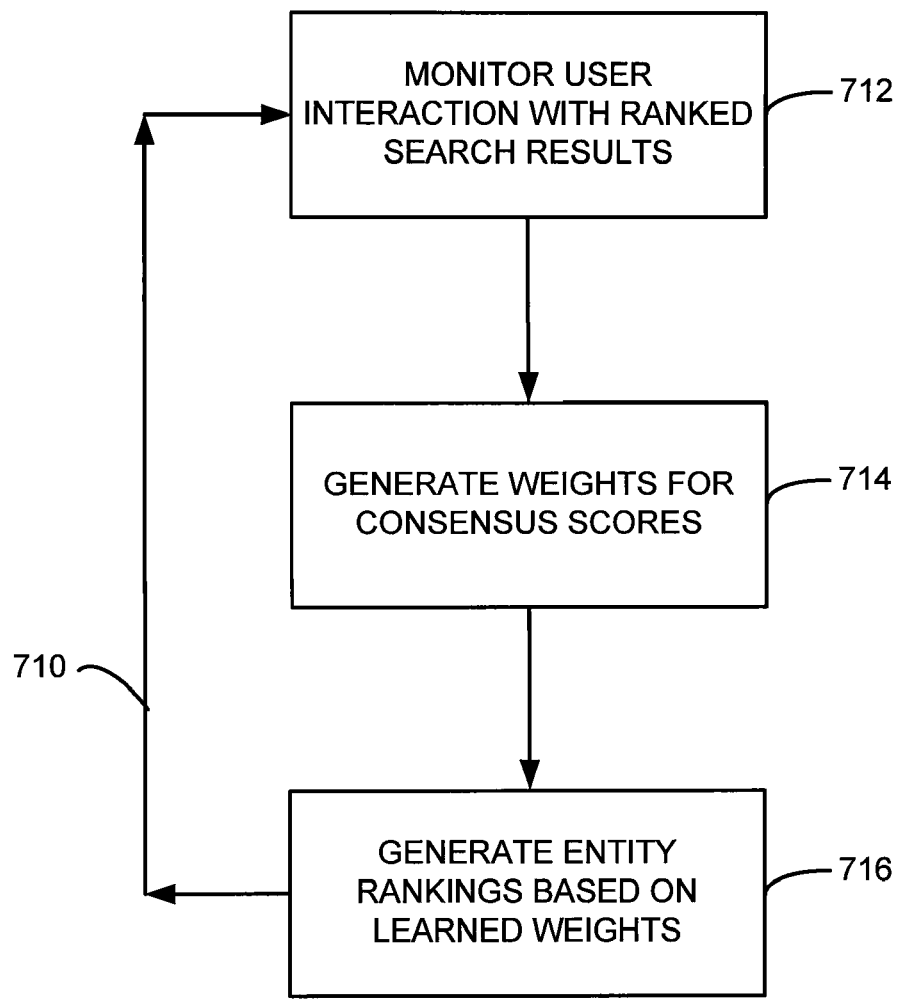
FIG. 7 is a flowchart illustrating a more detailed view of steps performed by an embodiment of the Ranking Analysis Engine 130 in learning weights for generating Entity Rankings 404.

FIG. 7 is a flowchart illustrating a more detailed view of steps performed by an embodiment of the Ranking Analysis Engine 130 in learning weights for generating Entity Rankings 404. Other embodiments perform additional and/or different steps that the ones described in the figure. In addition, other embodiments perform the steps in different orders and/or perform multiple steps concurrently. In some embodiments, the steps described in the figure are iteratively repeated 710.

The User Interaction Module 532 monitors 712 user interactions with search results associated with the Ranked Entities 415 to generate and store user interaction metrics in the User Interaction Database 148. Search results associated with Ranked Entities 415 are typically presented as web pages for the Ranked Entities 415 but can also consist of directory listings for the Ranked Entity 415 or other documents which contain information about the Ranked Entity 415. The User Interaction Module 532 is adapted to communicate with a search engine program on a server through the Network 114. The User Interaction Module 532 monitors user interaction to generate user click through rates for each search result associated with a Ranked Entity 415. The user click through rate represents the number of times a search result associated with a Ranked Entity 415 was clicked by a user, divided by the number of times that result was presented to a user.

The User Interaction Module 532 also monitors 712 user interactions to generate metrics representing the time spent at search result associated with a Ranked Entity 415. The User Interaction Module 532 monitors 712 and records the amount of time the user spends at a search result associated with a Ranked Entity 415 before returning to the web page displaying the ranked search results associated with the Ranked Entities 415. In some embodiments, the User Interaction Module 532 monitors 712 other metrics of user interaction. Other suitable user-interaction metrics will be apparent to those skilled in the art of web search engines. The user interaction metrics are stored in the User Interaction Database 148 and may be combined in any way to generate the User Interaction Score 408 stored in the Entity Ranking Database 146.

The Rank Learning Module 542 generates 716 the values of the Sentiment Score Weight 412 and Normalized Rating Weight 416 based on the User Interaction Score 148. In one embodiment, the Sentiment Score Weight 412 and Normalized Rating Weight 416 are determined based on generating a correlation coefficient between both the Consensus Sentiment Score 410 and the Consensus Normalized Rating 414 and the User Interaction Score 406. Each of the generated correlation coefficients is then divided by the sum of the two correlation coefficients to generate the Sentiment Score Weight 412 and the Normalized Rating Weight.

In other embodiments, the Sentiment Score Weight 412 and Normalized Rating Weight 416 are determined by generating a mixture model 132 to approximate the weight of influence of the Consensus Sentiment Score 410 and the Consensus Normalized Rating 414 on the User Interaction Score 406. Suitable mixture models 132 to determine the weight of the Consensus Sentiment Score 410 and the Consensus Normalized Rating 414 on the User Interaction Score 406 include expectation maximization (EM) models, Markov Chain Monte Carlo models and Spectral models. In an alternate embodiment, the mixture model 132 may also incorporate the User Interaction Score 406 to determine an optimal User Interaction Score Weight 408. Alternate embodiments may use predictive models such as classifiers to determine the values of the Sentiment Score Weight 412 and Normalized Rating Weight. Other methods of determining the Sentiment Score Weight 412 and Normalized Rating Weight 416 will be readily apparent to those skilled in the art.

The Rank Learning Module 542 generates 716 the Entity Rankings 404 based on the learned Sentiment Score Weights 412 and Normalized Rating Weights 416. In one embodiment, the Rank Learning Module 542 generates the Entity Ranking 404 based on a linear combination of each score and its corresponding weight. That is, the Entity Ranking 404 is the sum of the Consensus Sentiment Score 410 multiplied by the Sentiment Score Weight 412, the Consensus Normalized Rating 414 multiplied by the Normalized Rating Weight 416, and the User Interaction Score 406 multiplied by the User Interaction Score Weight 408. Alternate methods of combining the weights and scores to produce a single Entity Ranking 404 will be apparent to those skilled in the art.

Figure 8:
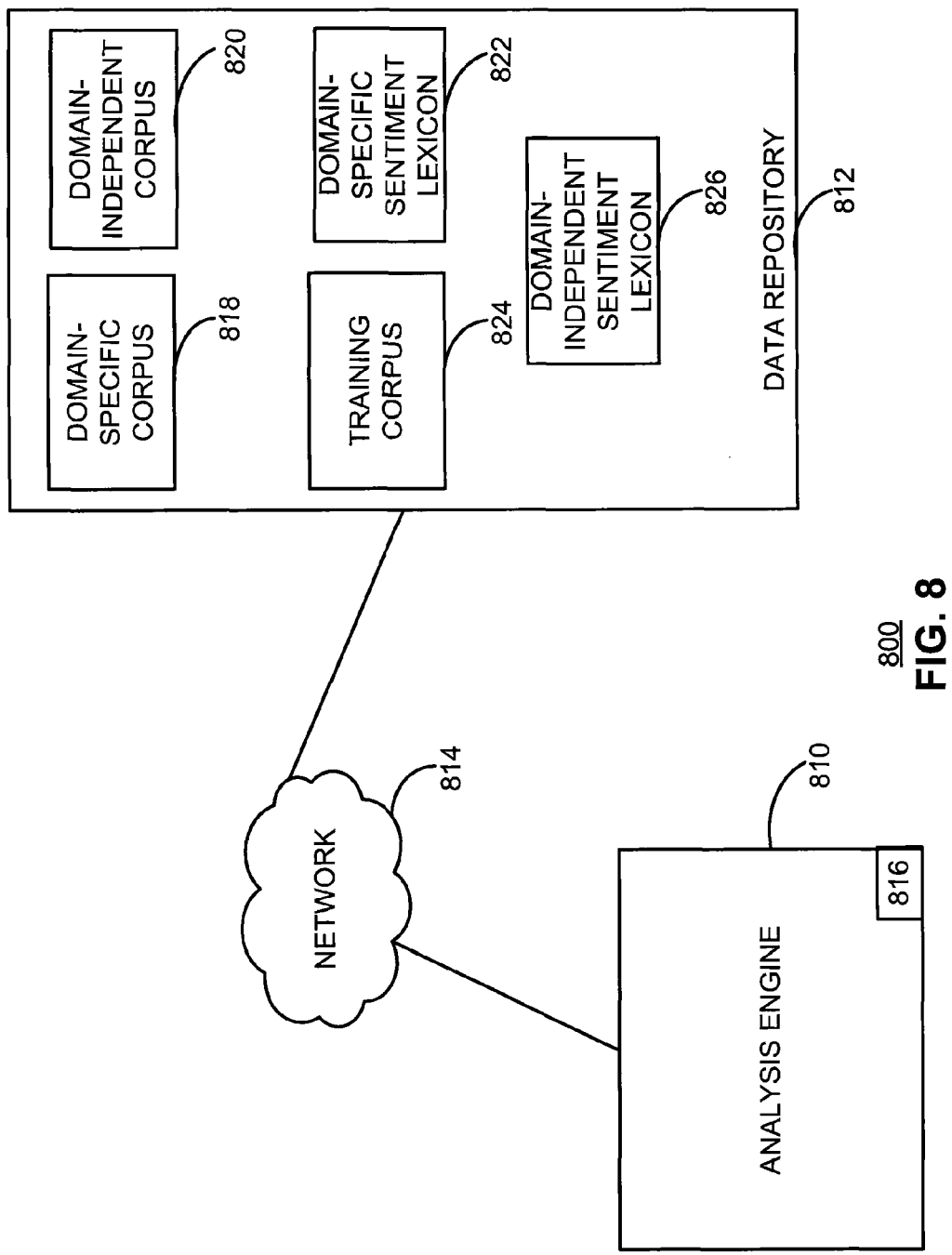
FIG. 8 is a high level block diagram of a computing environment for generating sentiment scores according to one embodiment.

FIG. 8 is a high-level block diagram of a computing environment 800 for generating Sentiment Scores 312 according to one embodiment. FIG. 8 illustrates an analysis engine 810 and a data repository 812 connected to a network 814. Although FIG. 8 illustrates only a single analysis engine 810, embodiments can have multiple engines. Likewise, there can be multiple data repositories on the network 814. Only one of each entity is illustrated in order to simplify and clarify the present description. There can be other entities on the network 814 as well. In some embodiments, the analysis engine 810 and data repository 812 are combined into a single entity.

The analysis engine 810 supports domain-specific sentiment classification for documents stored in the repository 812 and/or other locations. In one embodiment, the analysis engine 810 uses the documents in the repository 812 to identify a domain-specific sentiment lexicon 822 of n-grams. In addition, the analysis engine 810 uses the n-grams in the domain-specific sentiment lexicon 822 as features in a model in order to build a highly-accurate domain-specific sentiment classifier 816. The analysis engine 810 uses the classifier 816 to classify the sentiment of documents stored in the repository 812 and/or on the network 814. In one embodiment, the analysis engine 810 is controlled by an administrator or other user who uses it to build the classifier and/or perform automated sentiment classification of documents.

The data repository 812 stores documents and other data utilized by the analysis engine 810 to build a domain-specific sentiment classifier 816. In one embodiment, the data repository stores sets of documents organized into various corpora. The corpora include a domain-specific corpus 818 holding domain-specific documents and a domain-independent corpus 820 holding domain-independent (i.e., non-specific) documents. In one embodiment, the domain-specific corpus 818 contains enough documents to constitute a representative sample of how sentiment is expressed in the domain. Likewise, the domain-independent corpus 820 contains enough documents to constitute a representative sample of how sentiment is expressed generally, exclusive of any specific domain.

As used herein, the term "domain" refers to a particular sphere of activity, concern or function, such as restaurants, electronic devices, international business, and movies. The term "domain" does not necessarily refer to Internet domain names, although certain web sites at certain Internet domains might include documents related to a particular sphere of activity, concern or function.

In one embodiment, both corpora hold documents obtained via the network 814. The documents include web pages and/or portions of web pages, the text of books, newspapers, and magazines, emails, newsgroup postings, and/or other electronic messages, etc. For example, the documents in the domain-specific corpus 818 can include documents related to restaurants, such as portions of web pages retrieved from web sites specializing in discussions about restaurants. Likewise, the domain-specific documents in the corpus 818 can include web pages retrieved from web sites that include reviews and/or discussion related to portable electronic devices, such as mobile telephones and music players. In contrast, the documents in the domain-independent corpus 820 can include documents associated with a variety of different domains, so that no single domain predominates. In addition, the documents in the domain-independent corpus 820 can be drawn from sources unrelated to any particular source, such as general interest magazines or other periodicals.

In some embodiments, the corpora hold documents obtained from sources other than the network. Moreover, in some embodiments the corpora are virtual in the sense that they are not stored at a single location. For example, the domain-specific corpus can be defined as the contents of one or more web sites devoted to restaurant reviews or other topics.

In one embodiment, the data repository 812 also includes the domain-specific sentiment lexicon 822 and a domain-independent sentiment lexicon 826. The domain-specific sentiment lexicon 822 contains a set of n-grams (i.e., words and/or phrases) that express sentiment in a particular domain. The domain-independent sentiment lexicon 826, in contrast, contains a set of n-grams that express sentiment in a general or non-specific domain. In one embodiment, each n-gram in the lexicons 822, 826 has an associated score indicating the polarity (i.e., positive or negative) and magnitude of the sentiment it expresses.

In one embodiment, the domain-independent sentiment lexicon 826 is based on a lexical database, such as the WordNet electronic lexical database available from Princeton University of Princeton, N.J. The lexical database describes mappings between related words. That is, the database describes synonym, antonym, and other types of relationships among the words. In one embodiment, the administrator selects initial terms for the domain-independent sentiment lexicon 826 by reviewing the lexical database and manually selecting and scoring words expressing high sentiment. The administrator initially selects about 360 such words in one embodiment although the number of words can vary in other embodiments. This initial set of words is expanded through an automated process to include synonyms and antonyms referenced in the lexical database. The expanded set of words constitutes the domain-independent sentiment lexicon 826.

An embodiment of the data repository 812 also includes a training corpus 824. In one embodiment, the training corpus 824 includes domain-specific documents labeled with corresponding sentiment scores. In some embodiments the domain-specific documents are manually labeled with sentiment scores. For example, in one embodiment the documents in the training corpus 824 are drawn from popular product review web sites such as Amazon, CitySearch, and Cnet. These sites include textual product reviews that are manually labeled by the review submitters with corresponding numeric or alphabetic scores (e.g., 4 out of 5 stars or a grade of "B−"). Further, in some embodiments the domain-specific documents are automatically labeled with sentiment scores. For example, in one embodiment the documents in the training corpus 824 include high-sentiment documents from the domain specific corpus 818 that are labeled with sentiment scores through an automated process as described below.

The network 814 represents the communication pathways among the analysis engine 810, the data repository 812, and any other entities connected to the network. In one embodiment, the network 814 is the Internet. The network 814 can also utilize dedicated or private communications links that are not necessarily part of the Internet. In one embodiment, the network 814 uses standard communications technologies and/or protocols. Thus, the network 814 can include links using technologies such as Ethernet, 802.11, integrated services digital network (ISDN), digital subscriber line (DSL), asynchronous transfer mode (ATM), etc. Similarly, the networking protocols used on the network 814 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 814 can be represented using technologies and/or formats including the HTML, the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). In other embodiments, the analysis engine 810 and data repository 812 use custom and/or dedicated data communications technologies instead of, or in addition to, the ones described above.

Figure 9:
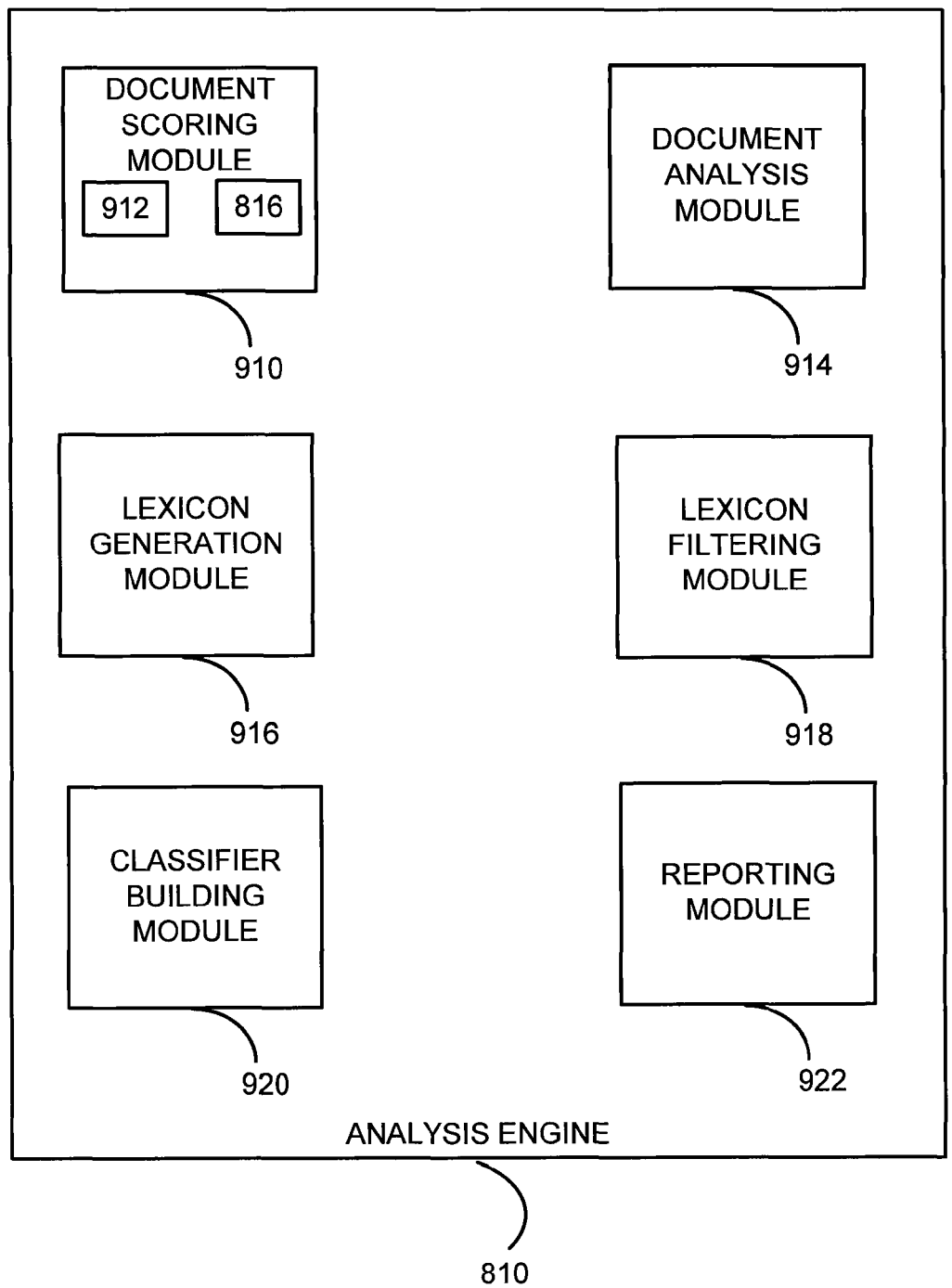
FIG. 9 is a high level block diagram illustrating modules within the analysis engine according to one embodiment.

FIG. 9 is a high-level block diagram illustrating modules within the analysis engine 810 according to one embodiment. Other embodiments have different and/or additional modules than the ones shown in FIG. 9. Moreover, other embodiments distribute the functionalities among the modules in a different manner.

A document scoring module 910 scores documents to determine the magnitude and polarity of the sentiment they express. In one embodiment, the document scoring module 910 includes one or more classifiers. These classifiers include a lexicon-based classifier 912 and the domain-specific classifier 816 created by the analysis engine 810.

An embodiment of the lexicon-based classifier 912 uses the domain-independent sentiment lexicon 826 to calculate sentiment scores for documents in the domain-specific corpus 818. The scoring performed by the lexicon-based classifier 912 essentially looks for n-grams from the domain-independent lexicon 826 that occur in the documents of the corpus 818. For each n-gram that is found, the classifier 912 determines a score for that n-gram based on the techniques/factors described below. The sentiment score for the document is the sum of the scores of the n-grams occurring within it.

Embodiments of the lexicon-based classifier 912 use one or more of the following techniques/factors to determine the score for an n-gram found in a document:

the n-gram score in the lexicon: An n-gram in the lexicon 826 has an associated score representing the polarity and magnitude of the sentiment it expresses. For example, "hate" and "dislike" both have negative polarities, and "hate" has a greater magnitude than "dislike;"

part-of-speech tagging: The part of speech that an n-gram represents is classified and a score is assigned based on the classification. For example, the word "model" can be an adjective, noun or verb. When used as an adjective, "model" has a positive polarity (e.g., "he was a model student"). In contrast, when "model" is used as a noun or verb, the word is neutral with respect to sentiment.

negation detection: An n-gram that normally connotes one type of sentiment can be used in a negative manner. For example, the phrase "This meal was not good" inverts the normally-positive sentiment connoted by "good."

location in document: A score is influenced by where the n-gram occurs in the document. In one embodiment, n-grams are scored higher if they occur near the beginning or end of a document because these portions are more likely to contain summaries that concisely describe the sentiment described by the remainder of the document.

stemming: Reverse conjugation of a word in an n-gram is performed in order to identify its root word. A score is assigned to the word based on its root.

A document analysis module 914 analyzes documents scored by the document scoring module 910. In one embodiment, the document analysis module 914 analyzes the documents scored by the lexicon-based classifier 912 and isolates the highest-scoring documents. An embodiment of the module 914 uses two scoring thresholds to partition the documents into a set of documents that express very negative sentiment and a set of documents that express very positive sentiment. Thus, documents that have a sentiment score lower than the negative sentiment threshold are placed in the "very negative sentiment" set while documents that have a sentiment score higher than the positive sentiment threshold are placed in the "very positive sentiment" set. Documents falling in the middle range are ignored for purposes of this analysis.

A lexicon generation module 916 creates the domain-specific lexicon 822 based on the sets of high-sentiment documents isolated by the document analysis module 914. The lexicon generation module 916 identifies all n-grams up to a predetermined value of 'n' that occur in the documents in each set. "N" is five in one embodiment. Further, the lexicon generation module 916 identifies the most frequently occurring n-grams in each of the high-sentiment document sets (i.e., the most frequently occurring n-grams from the very negative sentiment document set and the most frequently occurring n-grams from the very positive sentiment document set).

A lexicon filtering module 918 filters the n-grams produced by the lexicon generation module 916 to produce a set of domain-specific sentiment-expressing n-grams. In one embodiment, the filtering module 918 removes extremely common n-grams (i.e., stop words) from the very negative and very positive sets. This filtering removes words and phrases like "the," "or," "he," and "she" that are unlikely to express sentiment. The n-grams that remain after filtering constitute the domain-specific sentiment lexicon 822.

A classifier building module 920 builds the domain-specific classifier 816 used by the document scoring module 910. In one embodiment, the classifier building module 920 assigns a score to each n-gram in the domain-specific sentiment lexicon 822 that represents the polarity and magnitude of the sentiment it expresses. The domain-specific classifier 816 uses the n-gram scores in the domain-specific sentiment lexicon 822, along with the techniques and factors described above with respect to the lexicon-based classifier 912, to classify the sentiment expressed by domain-specific documents.

To assign the scores to the n-grams in the domain-specific sentiment lexicon 822, the classifier building module 920 uses the n-grams as feature in a model, such as a maximum entropy model, and trains the model on documents. Other models used in some embodiments to assign sentiment scores to the n-grams are based on support vector machines, Naïve Bayes, perceptron, Winnow, and LASSO (Least Absolute Shrinkage and Selection Operator) instead of, or in addition to, maximum entropy.

In one embodiment, the classifier building module 920 trains the model on the labeled documents in the training corpus 824. Recall that in one embodiment the documents in the training corpus 824 include documents with manually-labeled sentiment scores. In other embodiments, the documents in the training corpus 824 include the set of high-sentiment documents having the scores assigned by the document scoring module 910 and isolated by the document analysis module 914 via the automated process described above. The set of high-sentiment documents can be used, for example, if obtaining the manually-labeled documents is too expensive or difficult, or if there are not enough manually-labeled documents available. Some embodiments train on both manually- and automatically-labeled documents. The training assigns accurate sentiment scores to the n-grams in the domain-specific lexicon 822.

A reporting module 922 reports results of operations performed by the analysis engine 810. The reports can include generating a presentation on the display of a computer, storing data in a log file describing the operations performed, storing data resulting from the operations performed by the analysis engine in the repository 812 or elsewhere, and the like. For example, the reporting module 922 can save the output of the lexicon filtering module 918 in the repository 812 as the domain-specific sentiment lexicon 822. Likewise, the reporting module 922 can store the sentiment scores for the n-grams in the filtered high-sentiment n-gram set generated by the classifier building module 920, and sentiment scores for documents generated by the domain-specific classifier 816, in the data repository 812 or elsewhere.

Figure 10:
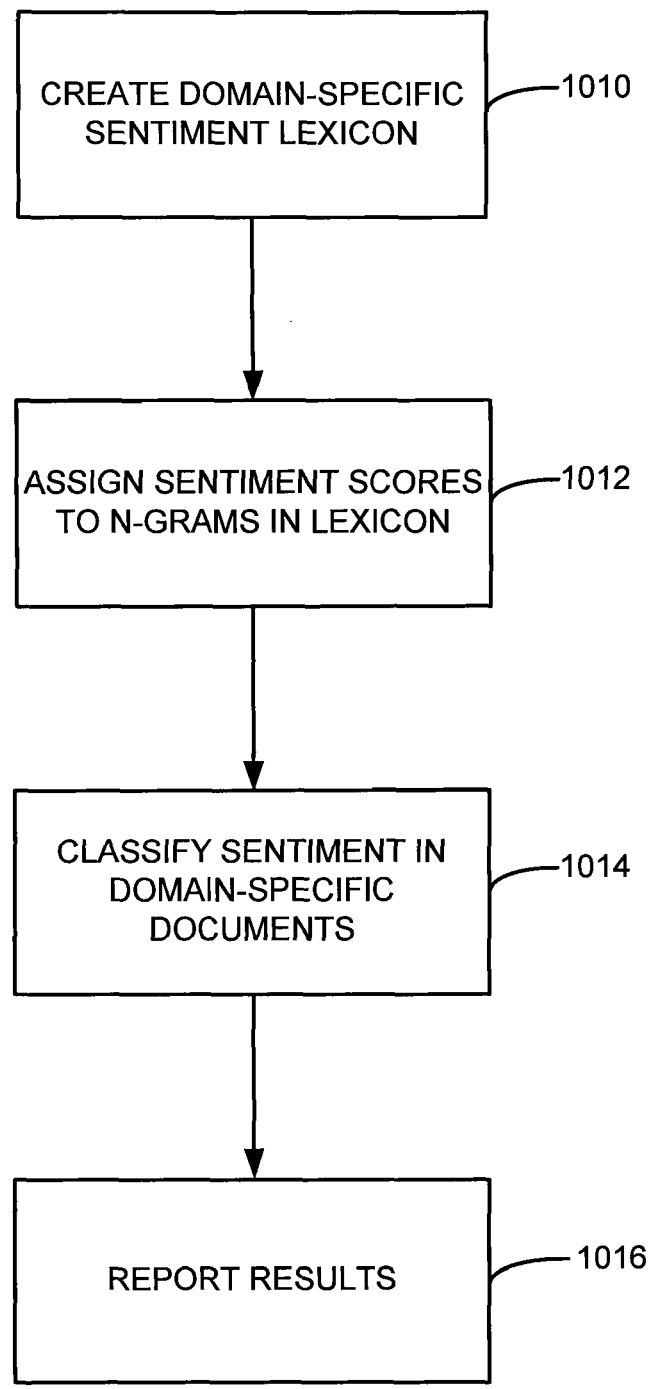
FIG. 10 is a flow chart illustrating steps performed by the analysis engine to build the domain specific classifier and apply the classifier to a set of domain specific documents according to one embodiment.

FIG. 10 is a flowchart illustrating steps performed by the analysis engine 810 to build the domain-specific classifier 816 and apply the classifier to a set of domain-specific documents according to one embodiment. Other embodiments perform additional and/or different steps that the ones described in the figure. In addition, other embodiments perform the steps in different orders and/or perform multiple steps concurrently. Certain embodiments perform only some of the steps, such as only the steps directed to building the classifier 816.

The analysis engine 810 creates 1010 a domain-specific lexicon 822 and saves it in the data repository 812. The analysis engine 810 uses the training corpus 824 to associate 1012 sentiment scores with the n-grams in the lexicon 822. The n-grams and associated scores are used by the domain-specific classifier 816. In one embodiment, the analysis engine 810 uses the domain-specific classifier 816 to classify 1014 sentiment in domain-specific documents. The analysis engine 810 reports 1016 the results of the classifications. The report can be used to track the sentiment of an entity within the specific domain, to influence rankings of search results, and/or for other purposes.

Figure 11:
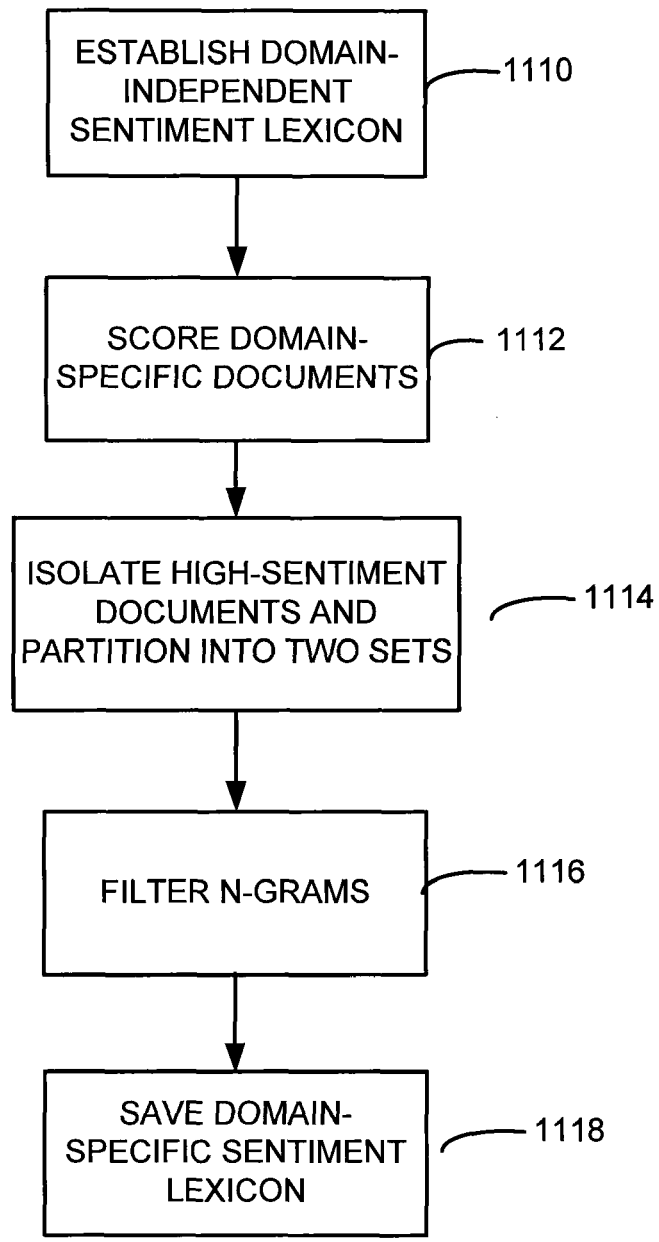
FIG. 11 is a flow chart illustrating a more detailed view of steps performed by an embodiment of the analysis engine in creating the domain specific sentiment Lexicon as illustrated in FIG. 10.

FIG. 11 is a flowchart illustrating a more detailed view of steps performed by an embodiment of the analysis engine 810 in creating the domain-specific sentiment lexicon as illustrated in step 1010 of FIG. 10. Other embodiments perform additional and/or different steps that the ones described in the figure. In addition, other embodiments perform the steps in different orders and/or perform multiple steps concurrently.

The analysis engine 810 establishes 1110 a domain-independent sentiment lexicon 826. As described above, in one embodiment this lexicon 826 is created by manually selecting words having high sentiment from a lexical database and identifying antonyms and synonyms of the selected words. The selected words, antonyms, and synonyms are included in the domain-independent sentiment lexicon 826. Other embodiments use a pre-defined domain-independent sentiment lexicon or use other techniques to create the lexicon.

The analysis engine 810 uses the domain-independent sentiment lexicon 826 to score 1112 sentiment of documents in a domain-specific corpus 818. Then, the analysis engine 810 isolates the high-sentiment documents and partitions 1114 those documents into a set of very negative sentiment documents and a set of very positive sentiment documents. The analysis engine 810 extracts n-grams from the negative- and positive-sentiment documents. These n-grams are filtered 1116 to remove extremely common words and phrases. The remaining n-grams are saved 1118 as a domain-specific sentiment lexicon 822.

Figure 12:
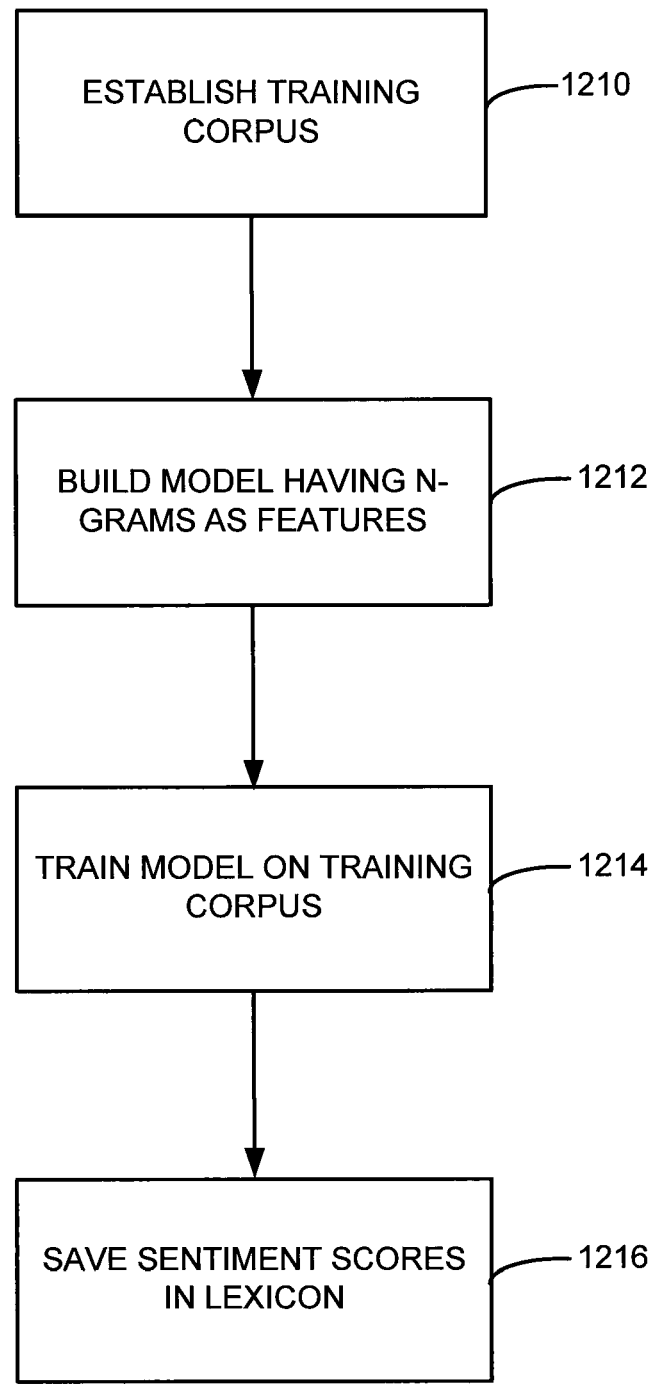
FIG. 12 is a flow chart illustrating a more detailed view of steps performed by an embodiment of the analysis engine as illustrated in FIG. 10.

FIG. 12 is a flowchart illustrating a more detailed view of steps performed by an embodiment of the analysis engine 810 in assigning sentiment scores to n-grams in the domain-specific sentiment lexicon 822 as illustrated in step 1012 of FIG. 10. Other embodiments perform additional and/or different steps that the ones described in the figure. In addition, other embodiments perform the steps in different orders and/or perform multiple steps concurrently.

The analysis engine 810 establishes 1210 a training corpus 824 of labeled documents. As described above, in some embodiments the training corpus 824 is established by collecting domain-specific documents that are manually labeled with sentiment scores while in other embodiments the training corpus 824 is established using the automatically-labeled set of high-sentiment documents isolated by the document analysis module 914. The analysis engine 810 builds 1212 a model, such as a maximum entropy model, having the n-grams of the domain-specific sentiment lexicon 822 as features. The model is trained 1214 on the labeled documents in the training corpus 824 to determine sentiment scores for the n-grams. These scores are saved 1216 in the domain-specific sentiment lexicon 822.

Those of skill in the art will recognize that the techniques described herein can be used to build multiple sentiment classifiers for documents in different domains. To this end, some embodiments have multiple domain-specific lexicons, domain-specific corpora, and training corpora. This description refers to a single domain-specific classifier 816 and domain for purposes of clarity.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method, comprising:
receiving a search query that references an entity type;
identifying search results that are associated with the entity type of the search query, each of the search results associated with a respective entity of a plurality of entities of the entity type;
ranking the search results based on entity ranking scores associated with the entities, wherein ranking a given search result of the search results is based on the entity ranking score of the entity associated with the given search result, and wherein the entity ranking score of the entity is based upon sentiment scores associated with review texts referencing the entity and values indicating likelihoods that the review texts reference the entity; and
providing the ranked search results responsive to the search query.

2. The method of claim 1, wherein the step of identifying the search results that are associated with the entity type of the search query includes identifying an association between the entities of the search results and the entity type in a database.

3. The method of claim 1, wherein the entity ranking score of the given search result is further based on ratings associated with the entity in the plurality of reviews, the reviews comprise ratings of the plurality of entities, and the ratings are separate from the review texts.

4. The method of claim 1, wherein the entity type includes one of hotels, films, restaurants, and cameras.

5. The method of claim 1, wherein ranking the given search result is further based on geographic location of the entity relative to a geographic location of a user submitting the search query.

6. The method of claim 1, wherein ranking the given search result is further based on a number of times the entity is mentioned in an index of web pages.

7. The method of claim 1, wherein each sentiment score for a review text indicates a sentiment directed to the entity by the review text.

8. The method of claim 1, wherein the given search result does not include a review of the entity and further comprising monitoring a plurality of user interactions with the given search result and revising the entity ranking score based at least in part on the plurality of user interactions with the given search result.

9. A non-transitory computer-readable storage medium encoded with computer program code, the computer program code comprising:
computer program code for receiving a search query that references an entity type;
computer program code for identifying search results that are associated with the entity type of the search query, each of the search results associated with a respective entity of a plurality of entities of the entity type;
computer program code for ranking the search results based on entity ranking scores associated with the entities, wherein ranking a given search result of the search results is based on the entity ranking score of the entity associated with the given search result, and wherein the entity ranking score of the entity is based upon sentiment scores associated with review texts referencing the entity and values indicating likelihoods that the review texts reference the entity; and
computer program code for providing the ranked search results responsive to the search query.

10. The non-transitory computer-readable storage medium of claim 9, wherein the computer program code for identifying the search results that are associated with the entity type of the search query includes identifying an association between the entities of the search results and the entity type in a database.

11. The non-transitory computer-readable storage medium of claim 9, wherein the entity ranking score of the given search result is further based on ratings associated with the entity in the plurality of reviews, the reviews comprise ratings of the plurality of entities, and the ratings are separate from the review texts.

12. The non-transitory computer-readable storage medium of claim 9, wherein the computer program code for ranking the given search result is further based on geographic location of the entity relative to a geographic location of a user submitting the search query.

13. The non-transitory computer-readable storage medium of claim 9, wherein the computer program code for ranking the given search result is further based on a number of times the entity is mentioned in an index of web pages.

14. The non-transitory computer-readable storage medium of claim 9, wherein each sentiment score for a review text indicates a sentiment directed to the entity by the review text.

15. The non-transitory computer-readable storage medium of claim 9, wherein the given search result does not include a review of the entity and further comprising computer program code for monitoring a plurality of user interactions with the given search result and revising the entity ranking score based at least in part on the plurality of user interactions with the given search result.

16. A system comprising:
at least one processor for executing instructions in program modules, the instructions including instructions to:
receive a search query that references an entity type;
identify search results that are associated with the entity type of the search query, each of the search results associated with a respective entity of a plurality of entities of the entity type;
rank the search results based on entity ranking scores associated with the entities, wherein the instructions to rank a given search result of the search results is based on the entity ranking score of the entity associated with the given search result, and wherein the entity ranking score of the entity is based upon sentiment scores associated with review texts referencing the entity and values indicating likelihoods that the review texts reference the entity; and
provide the ranked entities as search results responsive to the search query.

17. The system of claim 16, wherein the instructions to identify the search results that are associated with the entity type of the search query includes identifying an association between the entities of the search results and the entity type in a database.

18. The system of claim 16, wherein the entity ranking score of the given search result is further based on ratings associated with the entity in the plurality of reviews, the reviews comprise ratings of the plurality of entities, and the ratings are separate from the review texts.

19. The system of claim 16, wherein the instructions to rank the given search result is further based on geographic location of the entity relative to a geographic location of a user submitting the search query.

20. The system of claim 16, wherein the instructions to rank the given search result is further based on a number of times the entity is mentioned in an index of web pages.

21. The system of claim 16, wherein each sentiment score for a review text indicates a sentiment directed to the entity by the review text.

22. The system of claim 16, wherein the given search result does not include a review of the entity and wherein the instructions further include instructions to monitor a plurality of user interactions with the given search result and revising the entity ranking score based at least in part on the plurality of user interactions with the given search result.

23. A computer-implemented method, comprising:
receiving a search query that references an entity type;
identifying search results that are associated with the entity type of the search query, each of the search results associated with a respective entity of a plurality of entities of the entity type;
ranking the search results based on entity ranking scores associated with the entities, wherein ranking a given search result of the search results is based on the entity ranking score of the entity associated with the search result, and wherein the entity ranking score of the entity is based upon sentiment scores associated with review texts referencing the entity and values indicating likelihoods that the review texts reference the entity;
providing the ranked search results responsive to the search query;
monitoring a plurality of user interactions with the given search result in response to additional search queries, wherein monitoring the plurality of user interactions with the given search result comprises monitoring at least one of click throughs for the given search result and times spent at a document associated with the given search result; and
revising the entity ranking score of the entity based at least in part on the plurality of user interactions with the given search result.

24. The method of claim 23, wherein the entity is associated with an additional search result of the search results and further comprising:
monitoring a plurality of user interactions with the additional search result in response to additional search queries; and
revising the entity ranking score of the entity based at least in part on the plurality of user interactions with the additional search result.

25. The method of claim 23, further comprising:
receiving, after revising the entity ranking score of the entity, an additional search query that references the entity type;
identifying, in response to the additional search query, one or more of the search results that are associated with the entity of the entity type; and
ranking the identified search results based on the revised entity ranking score of the entity.

* * * * *